United States Patent
Arnal

(10) Patent No.: US 11,480,251 B2
(45) Date of Patent: Oct. 25, 2022

(54) CENTRED BUTTERFLY VALVE

(71) Applicant: KSB SAS, Gennevilliers (FR)

(72) Inventor: Fabien Arnal, Pessac (FR)

(73) Assignee: KSB SAS, Gennevilliers (FR)

( * ) Notice: Subject to any disclaimer, the term of this patent is extended or adjusted under 35 U.S.C. 154(b) by 117 days.

(21) Appl. No.: 16/623,832

(22) PCT Filed: Apr. 30, 2018

(86) PCT No.: PCT/EP2018/061051
§ 371 (c)(1),
(2) Date: Dec. 18, 2019

(87) PCT Pub. No.: WO2018/233915
PCT Pub. Date: Dec. 27, 2018

(65) Prior Publication Data
US 2021/0164574 A1  Jun. 3, 2021

(30) Foreign Application Priority Data
Jun. 20, 2017 (FR) .................................. 17 70655

(51) Int. Cl.
*F16K 1/226* (2006.01)
*F16K 1/228* (2006.01)

(52) U.S. Cl.
CPC .......... *F16K 1/2263* (2013.01); *F16K 1/2266* (2013.01); *F16K 1/2285* (2013.01)

(58) Field of Classification Search
CPC .... F16K 1/2263; F16K 1/2266; F16K 1/2285; F16K 1/228; F16K 1/226
USPC .......................................................... 251/306
See application file for complete search history.

(56) References Cited

U.S. PATENT DOCUMENTS

| 1,977,351 A | | 10/1934 | Phillips |
| 2,965,354 A | | 12/1960 | Grove et al. |
| 3,282,558 A | * | 11/1966 | Swain .................... F16K 1/2263 251/174 |
| 3,544,066 A | * | 12/1970 | Fawkes ................. F16K 1/2263 251/306 |
| 3,986,699 A | * | 10/1976 | Wucik, Jr. ............ F16K 1/2285 251/173 |
| 4,088,299 A | * | 5/1978 | Maciulaitis ........... F16K 1/2266 251/173 |

(Continued)

FOREIGN PATENT DOCUMENTS

| DE | 82 33 785 U | 6/1983 | ............. F16K 1/226 |
| GB | 1006377 | 9/1965 | |
| GB | 1 566 456 | 4/1980 | ............... F16K 1/22 |

OTHER PUBLICATIONS

International Search Report dated Jul. 23, 2018 in related application No. PCT/EP2018/061051.

*Primary Examiner* — Umashankar Venkatesan
*Assistant Examiner* — Andrew J Rost
(74) *Attorney, Agent, or Firm* — Renner, Kenner, Greive, Bobak, Taylor & Weber

(57) ABSTRACT

Valve comprising a body (2), a centred butterfly (1), mounted with the ability to rotate inside the body (2) from an open position revealing the passage to a closed position covering said passage, and a seal (3) arranged inside a housing which is delimited by the seat and by a face, opposite the seat in the closed position, of the butterfly, the seat and the face converging towards the inside in the axial direction. The seal (3) moves freely in the housing.

11 Claims, 3 Drawing Sheets

(56) References Cited

U.S. PATENT DOCUMENTS

| | | | | |
|---|---|---|---|---|
| 4,165,859 | A | * | 8/1979 | Maciulaitis ............. F16K 25/00 251/173 |
| 4,201,239 | A | | 5/1980 | Kawamura ..................... 137/72 |
| 4,290,615 | A | * | 9/1981 | Etcheverry ............ F16K 1/2263 251/306 |
| 4,335,748 | A | * | 6/1982 | Olansen ................ F16K 1/2263 251/306 |
| 4,634,097 | A | * | 1/1987 | Hubertson ............ F16K 1/2263 251/173 |
| 4,836,500 | A | * | 6/1989 | Pupillo ................. F16K 1/2263 251/306 |
| 5,427,354 | A | * | 6/1995 | Kusmer ................ F16K 1/2263 251/316 |
| 7,296,585 | B2 | * | 11/2007 | Eggleston ............... F16K 1/222 137/15.25 |
| 2014/0203201 | A1 | | 7/2014 | Kinser ......................... 251/306 |

* cited by examiner

CENTRED BUTTERFLY VALVE

CROSS-REFERENCE TO RELATED APPLICATION

This is a § 371 application of International patent application number PCT/EP2018/061051 filed Apr. 30, 2018, which claims the benefit of French patent application number 17 70655 filed on Jun. 20, 2017.

TECHNICAL FIELD

The present invention relates to butterfly valves. A butterfly valve is used to ensure upstream/downstream leaktightness within a circuit. It comprises a body, which forms part of the piping, and a butterfly which rotates on an axis perpendicular to the flow allowing the flow to pass through this passage or blocking this passage. In this document, the flow direction is the axial direction.

BACKGROUND ART

Since these components are rigid, they are usually accompanied by an intermediate seal, which is more flexible, and which allows these surfaces to be adapted to each other to guarantee an adequate sealing level. Said seal comprises a part ensuring static leaktightness, which forms part of one of the components, and a part ensuring dynamic leaktightness, which is in contact with the second component when the butterfly valve is closed. The static part may be fixed to the body or to the butterfly.

A butterfly valve generally also has two other seals to prevent fluid leaking outside the system, specifically the shaft/body seal and the body/piping seal.

In a centred butterfly valve, the seal is provided in the median plane of the butterfly in the closed position. In this position, the seal is tangential to the dynamic contact surface (or seat) (of the body or the butterfly, depending on the configuration).

To ensure the required sealing level, it is necessary to provide a contact pressure between the seal and the dynamic seat. This contact pressure is provided by a radial clamping dimension in the design phase. This is reflected by the flexible seal being flattened against the rigid dynamic seat, with the contact pressure being dependent on the elasticity of the seal.

The symmetrical design of this type of valve ensures that it performs equally in both flow directions. U.S. Pat. No. 1,977,351 A describes a centred butterfly valve with a seal mounted on the body, for example.

The centred butterfly valve is not self-sealing because the contact force is purely perpendicular to the force generated by the fluid. This means that this force is entirely due to the initial clamping of the seal. This results in the following disadvantages:
the torque required to actuate the butterfly because the seal rubs against the dynamic seat whenever the butterfly valve rotates;
premature wear on the contact surfaces due to this sliding friction and
the physical limit of the current materials, since this does not permit the seals to undergo high compression levels without the material tearing, particularly due to the closing kinematics of the butterfly; this leads to restrictions on the permissible operating pressure.

Another disadvantage of the centred butterfly valve is that the sealing plane (median plane of the butterfly valve in the closed position) also includes the drive shaft (axis of rotation). This makes it necessary to create a sealing system to bypass this shaft on both sides, which makes the individual parts more complex.

US 2014/203201 A1 describes a valve in which a seal 106 placed between a body 102 and a butterfly 104 is clamped in a housing between a retainer 120 and a surface 118 of the body 102. Similarly, in U.S. Pat. Nos. 4,201,239 A, 4,335,748 A, GB 1 566 456 A, GB 1 006 377 A and DE 82 33 785 U1, the seal is clamped, locked, mounted in a form-fitting manner or undercut, or incorporated in, the body by vulcanisation and prevented from moving in its entirety inside a housing.

SUMMARY OF THE INVENTION

The valve according to the invention comprises a body defining, by means of an annular internal seat, an internal area forming a passage with an axial direction, a centred butterfly mounted with the ability to rotate inside the body from an open position revealing the passage to a closed position covering said passage, and a seal arranged inside a housing which is delimited by the seat and by a face, opposite the seat in the closed position, of the butterfly, the seat and the face converging towards the inside in the axial direction. In the closed position, the seal is free to move in its entirety in all directions inside the housing.

As the seal is thus not connected statically to the body or to the butterfly of the valve, and is likewise not mounted in a clamped or form-fitting manner, operating with two areas of dynamic contact, one on the body and one on the butterfly, it assumes the most suitable position in the open position, without being stressed, constrained or pre-stressed. In the closed position, it is merely constrained by the fluid and thus does not experience any constraints due to fixing or clamping, and thus moves itself into the most suitable position, with the result that it is subject to the least possible fatigue. The service life of the valve is much higher as a result.

Means are preferably provided to prevent the seal from falling out of the housing simply by moving. The seal has to be deformed in order to leave the housing. These means may be an anti-ejection ring, or they may equally be a circumferential groove inside the body.

According to one embodiment of the invention, a housing dimension in the axial direction is larger than a seal dimension in the axial direction by between 1 and 50% of the seal dimension in the axial direction. This dimension is larger in the axial direction at a position on the housing that is furthest from the inside than any other position on the housing.

A housing dimension in a radial direction perpendicular to the axial direction may also be larger than a seal dimension in the radial direction by between 1 and 50% of the seal dimension in the radial direction. This dimension is larger in the radial direction at a position on the housing that is furthest from the inside than any other position on the housing.

The seat and the face opposite the seat of the butterfly in the closed position should preferably converge, without intersecting, in a continuous manner, without any geometric discontinuity such as a shoulder or a ridge.

In its simplest embodiment, the seal is an O-ring. The seals may also be a lip seal, preferably energised by an elastic core.

The O-ring seal has an internal diameter that is smaller than the maximum external diameter of the butterfly and an external diameter that is larger than the minimum internal diameter of the seat of the body.

In one alternative version, the valve is furnished with two seals on either side of the butterfly in the closed position.

BRIEF DESCRIPTION OF THE DRAWINGS

The attached drawings, which are reproduced purely by way of example, show the following.

DETAILED DESCRIPTION OF THE INVENTION

Figure 1:
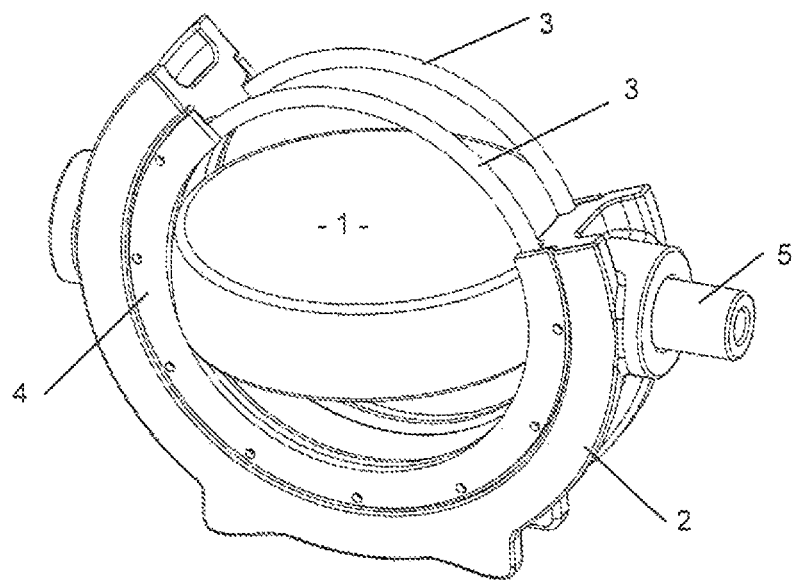
FIG. 1 is a perspective view with a partial cutaway of a butterfly valve according to the invention.

The butterfly valve according to the invention comprises a centred butterfly 1 with the ability to rotate subject to the action of a drive shaft 5, where the face opposite the seat (sealing zone) is an inclined sealing surface. The valve also comprises a body 2 defining an annular internal seat. The butterfly 1 is centred on the body 2. Finally, the valve comprises a seal 3 on one side of the body 2, maintained securely in the housing defined between the seat of the body 2 and the face of the butterfly 1 opposite the seat, by an anti-ejection ring 4 or in a groove in the body 2, but free to move in its entirety inside the housing. The seat and the face converge progressively towards the inside in the axial direction. A seal 8 of the drive shaft 5/body 2 is provided to prevent leaks when the valve is in the open position.

The seal 3 has an internal diameter that is smaller than the maximum external diameter of the butterfly 1 and an external diameter that is larger than the minimum internal diameter of the seat of the body 2.

Figure 5:
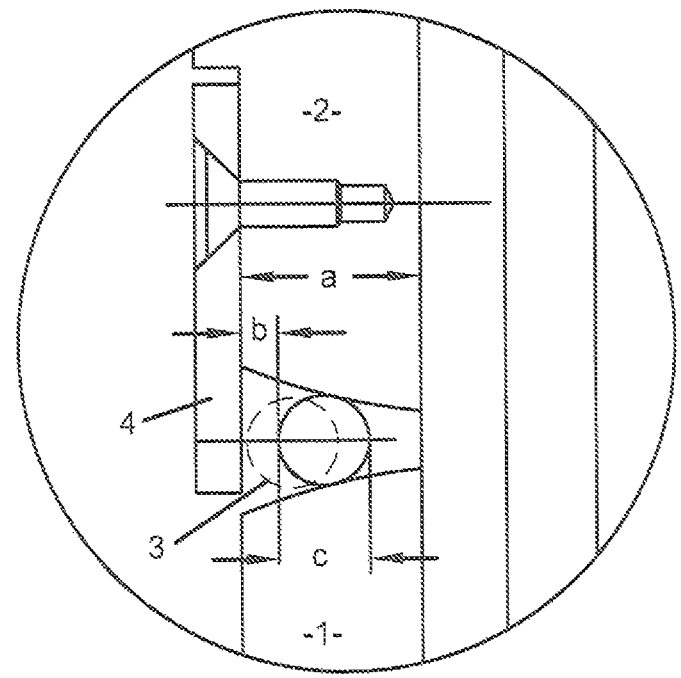
FIGS. 5 and 6 are larger-scale views of the left-hand side only of FIG. 2 as circled.

As shown in FIG. 5, where the seal 3 is shown by an unbroken line in the position it is in when the fluid pressure is applied to the seal and as a dotted line when no fluid pressure is applied to the seal, an axial dimension a of the housing of the seal 3 permits an axial freedom b of movement of the seal 3 equivalent to 1 to 50% of the axial dimension c of the seal 3 in a housing position further to the left of the figure than a different position closer to the inside.

Figure 6:
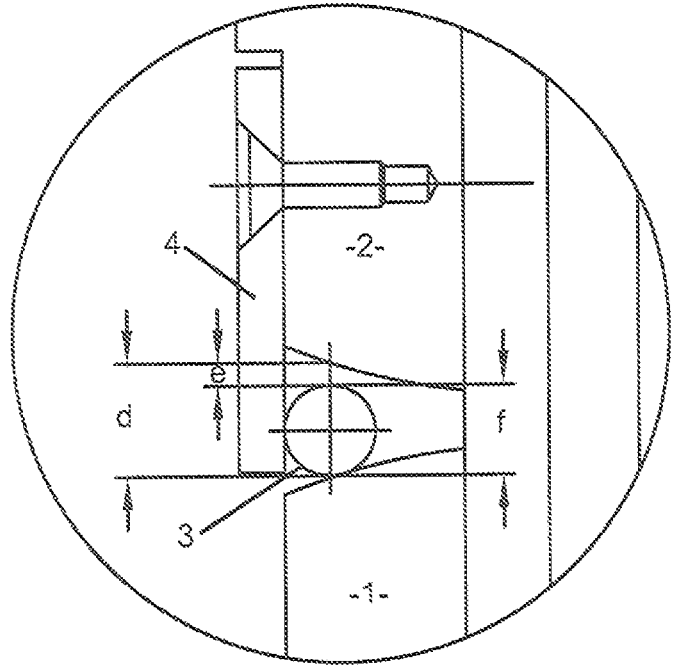

As shown in FIG. 6, where the seal 3 is shown in a possible position, in which the fluid pressure is not applied to the seal, a radial dimension d of the housing of the seal 3 permits a radial freedom e of movement of the seal 3 equivalent to 1 to 50% of the radial dimension f of the seal 3.

Figure 2:
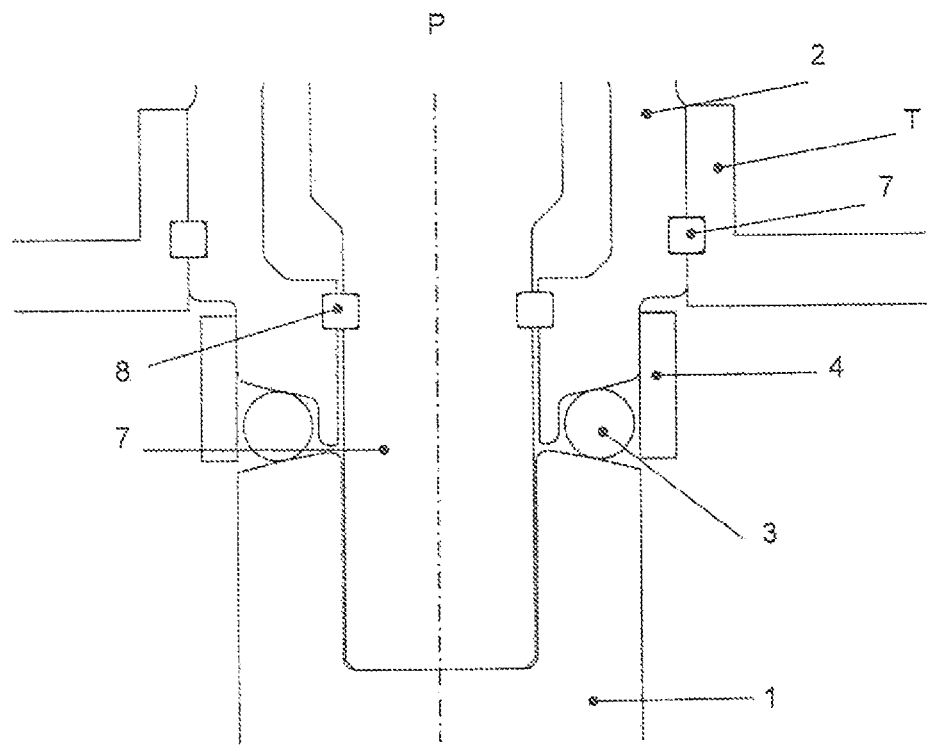
FIG. 2 is a partial sectional view of the above when the valve is closed.

In the version with two seals, the valve is symmetrical in relation to the median plane P (FIG. 2). Sealing in the upstream/downstream direction (seat of the body/seal/face opposite the seat of the butterfly) is axisymmetrical with respect to the axis of the fluid flow or the pipe. It comprises a seal 7 between the body 2 and the piping T to prevent leaks to the outside and a seal 8 between the shaft 5 and the body 2 to prevent leaks to the outside when the valve is in the open position. The distance between the median plane of the seal 3 when it is in a tangential position to the seats and the face opposite the ring 4 is less than or equal to the diameter of the cross-section of the seal 3.

Figure 3:
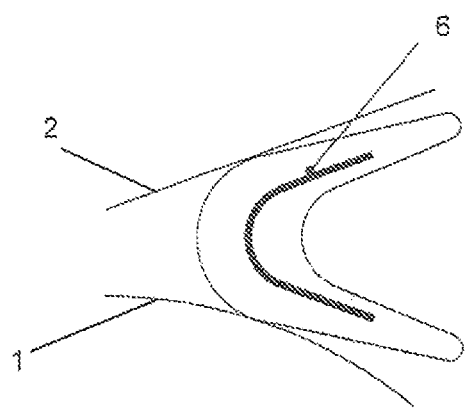
FIG. 3 shows the state of a lip seal when energised in the free state.
Figure 4:
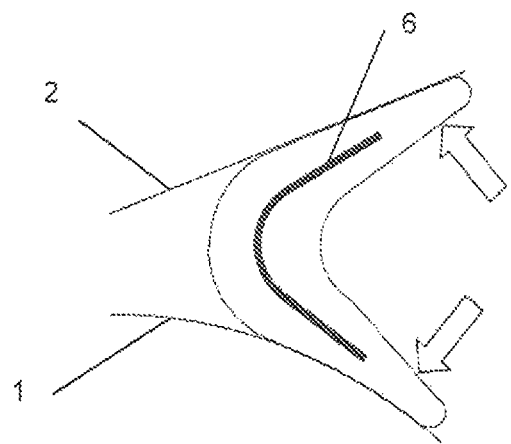
FIG. 4 shows this seal when it is pressurised.

FIG. 3 shows the position of an energised lip seal when the butterfly is in the open position. The elastic core 6 of the seal does not apply the seal to the body 2 and to the butterfly 1. In FIG. 4, the two lips of the seal are pressed respectively on the butterfly 1 and the body 2 by fluid pressure forces, which act against the return force of the elastic core 6.

The invention claimed is:

1. A valve comprising:
   a body defining, by means of an annular internal seat, an internal area forming a passage with an axial direction,
   a centred butterfly mounted with the ability to rotate inside the body from an open position revealing the passage to a closed position covering said passage,
   a seal arranged inside a housing which is delimited by the seat and by a face, opposite the seat in the closed position, of the butterfly, the seat and the face converging towards each other in a direction of a rotational axis of the centred butterfly, characterized in that, in the closed position, the seal is free to move in its entirety in all directions inside the housing.

2. The valve according to claim 1, characterized by a means of preventing the seal leaving the housing simply by moving without being deformed.

3. The valve according to claim 2, characterized in that said means is an anti-ejection ring.

4. The valve according to claim 2, characterized in that said means is a circumferential groove inside the body.

5. The valve according to claim 1, characterized in that a housing dimension in the axial direction is larger than a seal dimension in the axial direction by between 1 and 50% of the seal dimension in the axial direction.

6. The valve according to claim 5, characterized in that the housing dimension in the axial direction is at a position on the housing that is furthest from the inside than any other position on the housing.

7. The valve according to claim 1, characterized in that a housing dimension in a radial direction perpendicular to the axial direction is larger than a seal dimension in the radial direction by between 1 and 50% of the seal dimension in the radial direction.

8. The valve according to claim 7, characterized in that the housing dimension in the radial direction is at a position on the housing that is furthest from the inside than any other position on the housing.

9. The valve according to claim 1, characterized in that the seal is an O-ring or lip seal.

10. The valve according to claim 9, wherein the seal is energized by an elastic core.

11. The valve according to claim 1, characterized in that said valve is furnished with two seals on either side of the butterfly in the closed position.

* * * * *